(12) United States Patent
Sander

(10) Patent No.: US 8,011,095 B2
(45) Date of Patent: Sep. 6, 2011

(54) METHOD FOR PRODUCING A PISTON FOR AN INTERNAL COMBUSTION ENGINE

(75) Inventor: Wilfried Sander, Neckarsulm (DE)

(73) Assignee: MAHLE GmbH, Stuttgart (DE)

( * ) Notice: Subject to any disclaimer, the term of this patent is extended or adjusted under 35 U.S.C. 154(b) by 1089 days.

(21) Appl. No.: 11/791,376

(22) PCT Filed: Nov. 23, 2005

(86) PCT No.: PCT/DE2005/002108
§ 371 (c)(1),
(2), (4) Date: Jul. 12, 2007

(87) PCT Pub. No.: WO2006/056183
PCT Pub. Date: Jun. 1, 2006

(65) Prior Publication Data
US 2008/0209725 A1    Sep. 4, 2008

(30) Foreign Application Priority Data
Nov. 24, 2004    (DE) .......................... 10 2004 056 519

(51) Int. Cl.
*B21K 1/18* (2006.01)

(52) U.S. Cl. ........... 29/888.046; 29/888.04; 29/888.042; 29/888.043; 92/208; 92/213; 92/222; 123/193.6; 148/416; 148/549; 164/108; 164/110

(58) Field of Classification Search ............... 29/888.04, 29/888.042, 888.043, 888.046, 888.048; 92/193.6, 208, 212, 222, 213; 123/193.6, 123/270, 668; 148/416, 549; 164/97, 108, 164/110; 420/416, 438, 537; 428/293.1, 428/614, 653
See application file for complete search history.

(56) References Cited

U.S. PATENT DOCUMENTS

| 4,548,126 A | * | 10/1985 | Donomoto et al. ............. 92/213 |
| 4,587,177 A | | 5/1986 | Toaz et al. |
| 4,651,630 A | | 3/1987 | Zeilinger et al. |
| 4,662,326 A | * | 5/1987 | Kohnert ...................... 123/193.6 |
| 4,709,621 A | * | 12/1987 | Matsui et al. .................... 92/212 |

(Continued)

FOREIGN PATENT DOCUMENTS

DE    29 21 952 A1    12/1980

(Continued)

OTHER PUBLICATIONS

International Search Report.

*Primary Examiner* — Richard Chang
(74) *Attorney, Agent, or Firm* — Collard & Roe, P.C.

(57) ABSTRACT

The invention relates to a method for producing a piston for a combustion engine comprising a combustion recess, during which an annular fiber preform for reinforcing the edge of the combustion recess is firstly fastened inside the casting mold. Afterwards, a low-silicon aluminum/copper melt is introduced into the casting mold by which the fiber preform is infiltrated and molded into the recess edge within the scope of the casting process. The piston blank produced in this manner is then subsequently compacted by a high-temperature isostatic pressing before the piston is completed by means of a machining completion process. The flanks and the base areas of the second and third annular groove are coated by means of anodic oxidation, and the hub boreholes are smoothed and hardened by roller-burnishing. This results in a very high-quality and heavy-duty piston.

5 Claims, 1 Drawing Sheet

U.S. PATENT DOCUMENTS

Figure 1:
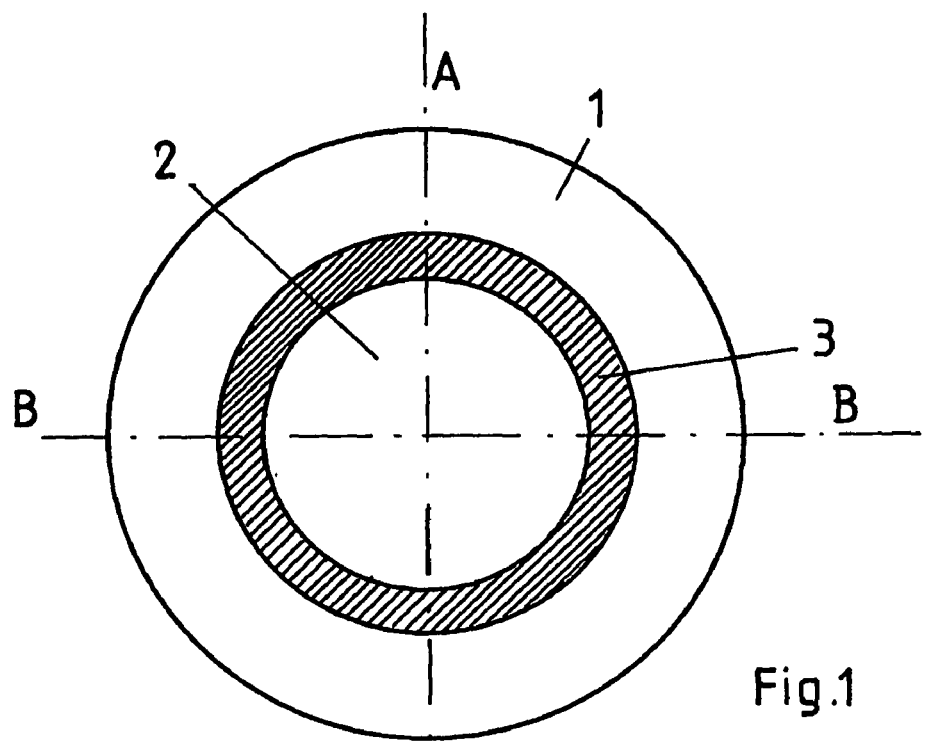

| | | | |
|---|---|---|---|
| 4,712,600 A * | 12/1987 | Hamajima et al. | 164/97 |
| 4,966,221 A | 10/1990 | Takasuga et al. | |
| 4,966,748 A | 10/1990 | Miyasaka et al. | |
| 5,115,770 A * | 5/1992 | Yen et al. | 123/193.6 |
| 5,120,372 A * | 6/1992 | Yen et al. | 420/537 |
| 5,505,171 A * | 4/1996 | Gazzard | 123/193.6 |
| 5,671,710 A * | 9/1997 | Sasaki | 123/193.6 |
| 6,432,557 B2 * | 8/2002 | Takehana et al. | 428/614 |

FOREIGN PATENT DOCUMENTS

| | | |
|---|---|---|
| DE | 34 30 056 C1 | 1/1986 |
| DE | 690 06 874 T2 | 9/1994 |
| DE | 197 24 899 C2 | 12/1998 |
| DE | 199 43 153 C1 | 1/2001 |
| EP | 0 151 952 B1 | 8/1985 |
| EP | 1 138 418 A | 10/2001 |
| JP | 62 288775 A | 12/1987 |
| JP | 02 137661 A | 5/1990 |

* cited by examiner

METHOD FOR PRODUCING A PISTON FOR AN INTERNAL COMBUSTION ENGINE

CROSS REFERENCE TO RELATED APPLICATIONS

Applicant claims priority under 35 U.S.C. §119 of German Application No. 10 2004 056 519.8 filed Nov. 24, 2004. Applicant also claims priority under 35 U.S.C. §365 of PCT/DE2005/002108 filed Nov. 23, 2005. The international application under PCT article 21(2) was not published in English.

The invention relates to a method for producing a piston for an internal combustion engine, having a combustion bowl, whereby a ring-shaped fiber preform that is provided for reinforcing the edge of the combustion bowl is attached in the casting mold, subsequently an aluminum/copper melt low in silicon is introduced into the casting mold, and in this connection, such a pressure difference is produced between the aluminum/copper melt and the fiber preform that the fiber preform is completely infiltrated by the aluminum/copper melt, thereby molding the fiber preform into the bowl edge.

This production method is known from the patent DE 34 30 056 C1. It is a disadvantage in this connection that an aluminum/copper melt experiences a relatively great volume deficit when it solidifies, and this brings about a very great microporosity in the solidified material and therefore a significant decrease in the strength of this material.

Proceeding from this, it is the task of the invention to improve the known method for producing pistons made of an aluminum/copper alloy low in silicon in such a manner that it can be used to produce pistons that are suitable for an ignition pressure stress of more than 200 bar, and that with this method, the strength of the piston material is improved to such an extent that it is possible to mold undercut and sharp-edged combustion bowls into the piston crown without problems.

This task is accomplished, according to claim 1, by means of subsequent compacting of the piston blank produced according to the method indicated above, by way of hot isostatic pressing, thereby resulting in a piston of high quality, which can withstand great stress.

Practical embodiments of the invention are the object of the dependent claims, whereby in particular, a further improvement in quality of the piston according to the invention is achieved by means of the formation of a friction-wear-resistant aluminum oxide layer on the walls and the base surfaces of the second and third ring groove, by means of anodic oxidation, and by means of rolling of the pin bosses.

The method according to the invention, for producing a piston for an internal combustion engine, will be described below, using the drawings. These show FIG. 1 a top view of the crown of a piston produced according to the method according to the invention, and FIG. 2 a two-part section along the axis of the piston, whereby the left half of the figure shows a section through the piston along the pin boss axis B, and the right half of the figure shows a section along an axis A that lies perpendicular to the former.

In order to implement the method according to the invention, for producing a piston 1 for an internal combustion engine, particularly for a diesel engine, an aluminum/copper alloy that is free of silicon, to the greatest extent possible, is used; this alloy can be composed as follows, with the numerical data indicating the weight percentages of the individual alloy components:

| Cu | 3.5 to 4.5 |
|---|---|
| Ni | 1.7 to 2.3 |
| Mg | 1.2 to 1.8 |
| Si | maximally 0.7 |
| Fe | maximally 1.0 |
| Mn | maximally 0.35 |
| Ti | maximally 0.25 |
| Zn | maximally 0.35 |
| Al | remainder. |

Another alloy suitable for producing the piston 1 according to the method according to the invention consists of the following components (numerical data are in weight-percent)

| Cu | 1.8 to 2.7 |
|---|---|
| Mg | 1.2 to 1.8 |
| Fe | 0.9 to 1.4 |
| Ni | 0.8 to 1.4 |
| Si | maximally 0.25 |
| Al | remainder. |

For producing the piston 1 having a combustion bowl 2, a casting method is used, by means of which the edge of the combustion bowl 2 is reinforced using a fiber preform 3, and the piston 1 can furthermore be provided with a ring insert 4 for a compression ring. This casting method must have the property of producing a sufficiently great pressure difference between melt and fiber preform 3 so that the fiber preform 3 is completely infiltrated with the melt used during casting, before the latter solidifies. Afterwards, not only are the individual fibers of the fiber preform 3 rigidly connected with the solidified melt, but also the fiber preform 3 itself is rigidly connected with the remainder of the piston 1.

The fibers of the fiber preform 3 are configured as short fibers of a ceramic material, for example of aluminum oxide. The fiber preform 3, in the form of a ring-shaped body having a rectangular cross-section, is produced in that the fibers are first treated to form an aqueous suspension containing a binder. Subsequently, the suspension is filled into a water-permeable mold that corresponds to the shape of the fiber preform 3, in which the water is removed from the suspension. The resulting body, in the form of the fiber preform 3, is dried, and can be mechanically pressed afterwards, in order to improve its strength. A proportion of the fibers per volume unit of 10% to 20% is aimed at.

Several casting methods for producing the piston according to the invention are known from the state of the art. In the case of one casting method, direct liquid pressing, first the fiber preform 3 and the ring insert 4 are laid into a stationary casting mold and fixed in place. In this connection, the fiber preform 3 comes to lie coaxial to the piston axis 10, and in the plane of the piston crown 5, and the ring insert 4 is positioned coaxial to the piston axis 10 and at a distance from the piston crown 5 that corresponds to the axial length of the top land 6. Subsequently, liquid aluminum melt is filled into the casting mold, and an axially movable casting mold core is lowered into the casting mold, which first closes the casting mold and then exerts pressure on the melt, which slowly solidifies.

The pressure exerted on the aluminum melt has the result, for one thing, that the fiber preform 3 is infiltrated by the melt. For another thing, the pressure exerted on the melt leads to a reduction in the porosity of the solidified aluminum. This can result in sufficient strength of the piston material for certain purposes.

Another casting method, having the name RMD casting method, an abbreviation for "robot-aided medium pressure die casting," is also well suited for producing the piston according to the invention. In this connection, the ring insert 4 is first attached in the casting mold, at the location provided for this purpose. Subsequently, the casting mold is closed off with a lid that has several suction pipes disposed radially on the outside, which are connected with a vacuum pump and open into such locations in the interior of the casting mold that the fiber preform 3 lies against the openings of the suction pipes, and is held in the intended location by the vacuum that prevails in the pipes. The aluminum/copper melt is now introduced into the casting mold by way of a feed opening disposed centrally in the lid, whereby the vacuum that prevails in the pipes ensures that the fiber preform 3 held against the suction pipes by the vacuum is infiltrated by the melt. Furthermore, the feed opening is connected with a compressed air line, by way of which air under high pressure is introduced into the casting mold after the casting mold is filled with the melt, having the result that the porosity of the solidified aluminum/copper alloy is reduced, which results in a strength of the piston that is sufficient for specific purposes.

However, if the piston is intended for purposes that demand a greater strength of the piston material and therefore a greater reduction in porosity, the cast piston blank is subsequently compacted by means of hot isostatic pressing (HIP).

For this purpose, the piston is placed in an autoclave into which gas is pressed at a temperature of 400° C. to 600° C. and a pressure of 700 to 1000 bar. After a holding time of approximately 4 to 6 hours, the compacting process of the piston material is completed, and the piston 1 has a compact material structure without porosity in the regions underneath the casting surface.

Figure 2:
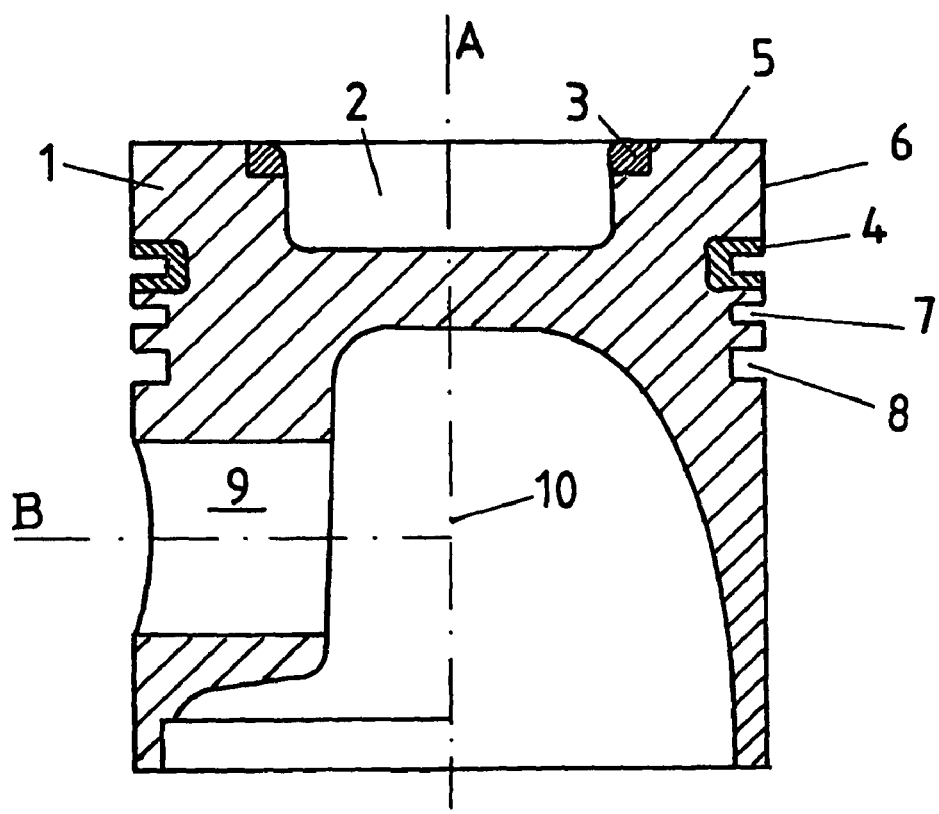

Subsequent to this, the piston blank is given its final shape, as shown in FIG. 2, by means of a cutting machining method.

In order to further improve the quality of the piston 1, the walls and the base surfaces of the second and third ring groove 7 and 8, which are subject to particularly severe stress in the case of a diesel piston, can be provided with a friction-wear-resistant coating by way of anodic oxidation. In this connection, the method of selective coating is used, whereby those piston regions that are not supposed to be coated are covered up. In the present case, the entire piston, with the exception of the second and third ring groove 7 and 8, is covered with a cover-up layer, and afterwards, the piston 1 is connected with the plus pole of a direct current source and dipped into an electrolyte, for example sulfuric acid. Furthermore, one or more cathodes connected with the minus pole of the direct current source are dipped into the electrolyte. When current flows, a compact and friction-wear-resistant aluminum oxide layer forms on the surfaces of the second and third ring groove.

In the case of diesel pistons, the pin bores 9 are also subject to particular stress. In this connection, the method of rolling for microfinishing the pin bores 9 provides a remedy; it is particularly suitable for pistons made from an aluminum/copper alloy low in silicon. In this connection, one or more rollers have a force that is directed approximately perpendicular to the pin boss working surface applied to them, and they are moved over the working surface. As a consequence of this, even tiny irregularities in the pin boss working surface are evened out. Furthermore, as a result, inherent pressure stresses are introduced into the material in this manner, thereby improving the strength of the pin boss inside surface. These inherent pressure stresses are maintained for a long time, because of the great heat resistance of aluminum/copper alloys that are low in silicon, and are not reduced by means of relaxation. Furthermore, in the case of this material, the recrystallization that occurs after cold deformation, within the framework of rolling, takes place without any significant volume change, so that undesirable tensile stresses in the material are avoided.

| Reference Symbol List | |
|---|---|
| A | crosswise axis |
| B | pin boss axis |
| 1 | piston |
| 2 | combustion bowl |
| 3 | fiber preform |
| 4 | ring insert |
| 5 | piston crown |
| 6 | top land |
| 7 | second ring groove |
| 8 | third ring groove |
| 9 | pin boss |
| 10 | piston axis |

The invention claimed is:

1. A method for producing a piston (1) for an internal combustion engine, having a combustion bowl (2), comprising:
    attaching a ring-shaped fiber preform (3) having a shape that is suitable for reinforcing an edge of the combustion bowl (2) in a casting mold for the piston (1), coaxial to a piston axis (10) in a plane of the piston crown (5),
    attaching a ring insert (4) coaxial to the piston axis (10) in the casting mold, at a distance from the piston crown (5) that corresponds to an axial length of a top land (6),
    introducing an aluminum/copper melt low in silicon into the casting mold, for producing a piston blank,
    producing a pressure difference between the aluminum/copper melt and the fiber preform (3) such that infiltration of the aluminum/copper melt into the fiber preform (3) occurs,
    subsequently compacting the piston blank by means of hot isostatic pressing,
    machining the piston blank by means of a cutting machining for producing the piston (1), whereby a second and third ring groove (7, 8) are machined into the piston (1) and pin bosses with pin bores (9) are molded onto the piston (1).

2. The method for producing the piston (1) according to claim 1, wherein 1.8 to 4.5 weight-percent copper and maximally 0.7 weight-percent silicon are mixed into the aluminum/copper melt.

3. The method for producing the piston (1) according to claim 1, wherein fibers of a ceramic material are used in a production of the fiber preform (3), which fibers are compacted in such a manner that a proportion of the fibers per volume unit of 10% to 20% is obtained.

4. The method for producing the piston (1) according to claim 1, wherein during the hot isostatic pressing, the piston (1) is placed in an autoclave for 4 to 6 hours, into which gas is pressed at a temperature of 400° C. to 600° C. and a pressure of 700 to 1000 bar.

5. The method for producing the piston (1) according to claim 1, wherein the pin bores (9) are evened out and compacted using a method of rolling.

* * * * *